(12) United States Patent
Wang

(10) Patent No.: US 12,552,494 B2
(45) Date of Patent: Feb. 17, 2026

(54) MOTORCYCLE-REVERSING DEVICE

(71) Applicant: Mu-Shan Wang, Taichung (TW)

(72) Inventor: Mu-Shan Wang, Taichung (TW)

( * ) Notice: Subject to any disclaimer, the term of this patent is extended or adjusted under 35 U.S.C. 154(b) by 435 days.

(21) Appl. No.: 18/218,070

(22) Filed: Jul. 4, 2023

(65) Prior Publication Data

US 2025/0010944 A1    Jan. 9, 2025

(51) Int. Cl.
*B62M 11/04* (2006.01)
*B62M 25/04* (2006.01)

(52) U.S. Cl.
CPC ............ *B62M 11/04* (2013.01); *B62M 25/04* (2013.01)

(58) Field of Classification Search
CPC .............................. B62M 11/04; B62M 25/04
USPC ....................................................... 180/205.7
See application file for complete search history.

(56) References Cited

U.S. PATENT DOCUMENTS

| | | | |
|---|---|---|---|
| 8,267,214 B2* | 9/2012 | Arnold .................. | B62M 17/00 180/230 |
| 2013/0288846 A1* | 10/2013 | Schwarz ................ | B62M 11/00 475/210 |
| 2016/0102752 A1* | 4/2016 | Yelvington ............ | B62K 11/04 475/269 |

* cited by examiner

*Primary Examiner* — Valentin Neacsu
*Assistant Examiner* — Felicia L. Brittman-Alabi
(74) *Attorney, Agent, or Firm* — Wang Law Firm, Inc.

(57) ABSTRACT

A motorcycle-reversing device incudes an internal rack, two ears, a power unit and a clutch. The internal rack is connected to a rim of a motorcycle. The ears are connected to a frame of the motorcycle. The power unit includes two bars, a movable box, a motor and a pinion. The bars are connected to the ears. The movable box includes two minor sleeves for receiving the bars. The motor is located in the movable box. The pinion is operatively connected to the motor. The clutch is pivotable to move the movable box between a first position where the pinion is engaged with the internal rack and a second position where the pinion is disengaged from the internal rack.

6 Claims, 8 Drawing Sheets

MOTORCYCLE-REVERSING DEVICE

BACKGROUND OF INVENTION

1. Field of Invention

The present invention relates to a motorcycle or scooter and, more particularly, to a motorcycle-reversing device.

2. Related Prior Art

A rider moves a motorcycle or scooter forward with an engine used on the motorcycle or scooter. However, a rider has to manually move the motorcycle or scooter backward. It is easy to manually move a small and light motorcycle or scooter backward. However, it is difficult to manually move a large and heavy motorcycle or scooter backward. To solve this problem, some manufacturers come up with transmissions to allow backward movement with engines. However, such transmissions are expensive and not suitable for all models of motorcycles and scooters. In addition, such transmissions are not useful for motorcycles or scooters already on the road. Moreover, operation of such transmissions takes is troublesome and lengthy.

The present invention is therefore intended to obviate or at least alleviate the problems encountered in the prior art.

SUMMARY OF INVENTION

It is the primary objective of the present invention to provide a convenient motorcycle-reversing device.

To achieve the foregoing objective, the motorcycle-reversing device incudes an internal rack, two ears, a power unit and a clutch. The internal rack is connected to a rim of a motorcycle. The ears are connected to a frame of the motorcycle. The power unit includes two bars, a movable box, a motor and a pinion. The bars are connected to the ears. The movable box includes two minor sleeves for receiving the bars. The motor is located in the movable box. The pinion is operatively connected to the motor. The clutch is pivotable to move the movable box between a first position where the pinion is engaged with the internal rack and a second position where the pinion is disengaged from the internal rack.

Other objectives, advantages and features of the present invention will be apparent from the following description referring to the attached drawings.

BRIEF DESCRIPTION OF DRAWINGS

The present invention will be described via detailed illustration of the preferred embodiment referring to the drawings wherein.

DETAILED DESCRIPTION OF PREFERRED EMBODIMENT

Referring to FIGS. 1 through 4, a motorcycle or scooter including a frame M2 and a rear wheel is equipped with a motorcycle-reversing device according to the preferred embodiment of the present invention. The rear wheel includes a tire M1 extending around a rim M3. The motorcycle-reversing device includes an internal rack 12, two ears 14, a power unit 20 and a clutch 30.

Figure 1:
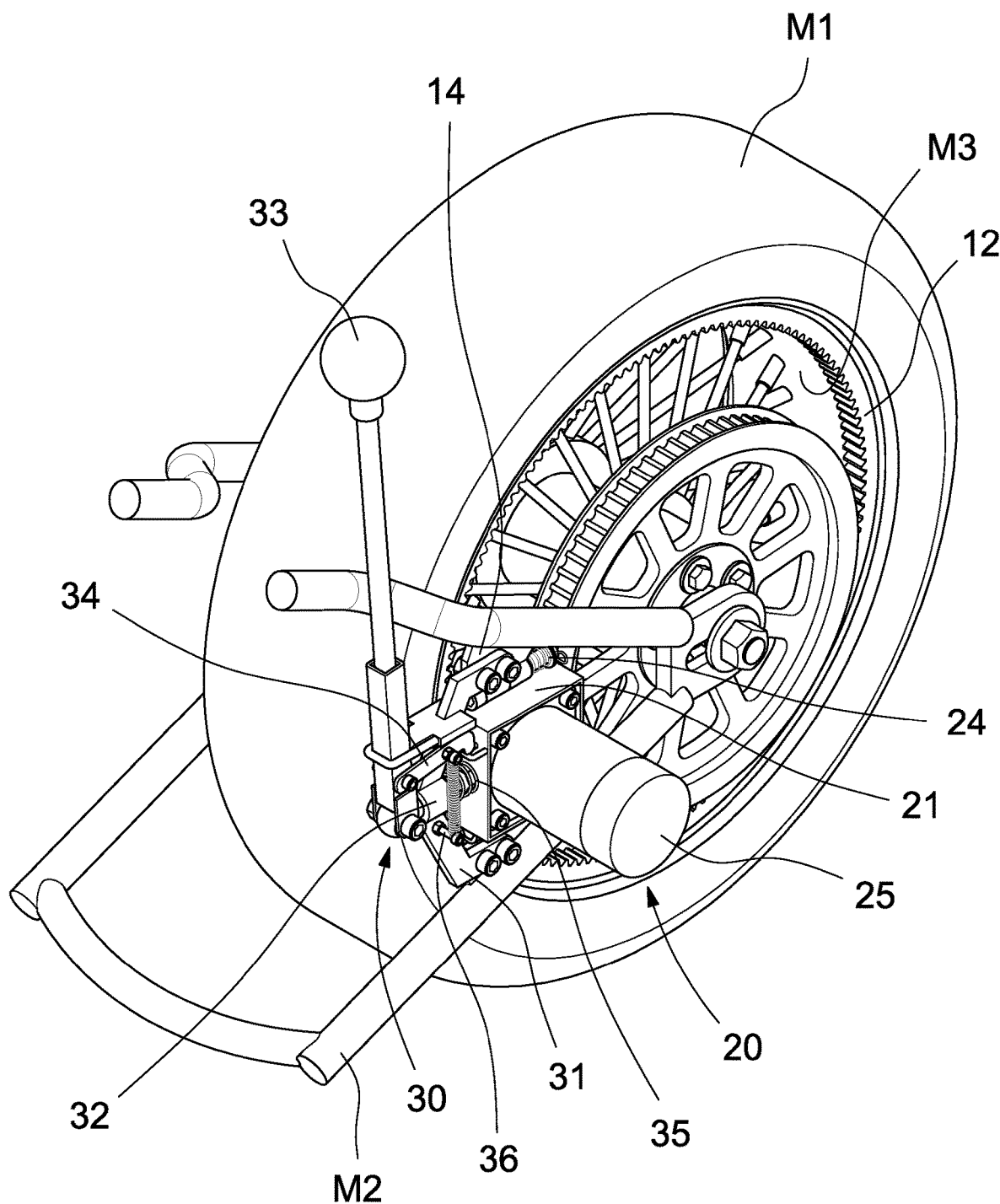
FIG. 1 is a perspective view of a rear wheel of a motorcycle or scooter and a motorcycle-reversing device according to the preferred embodiment of the present invention.
Figure 2:
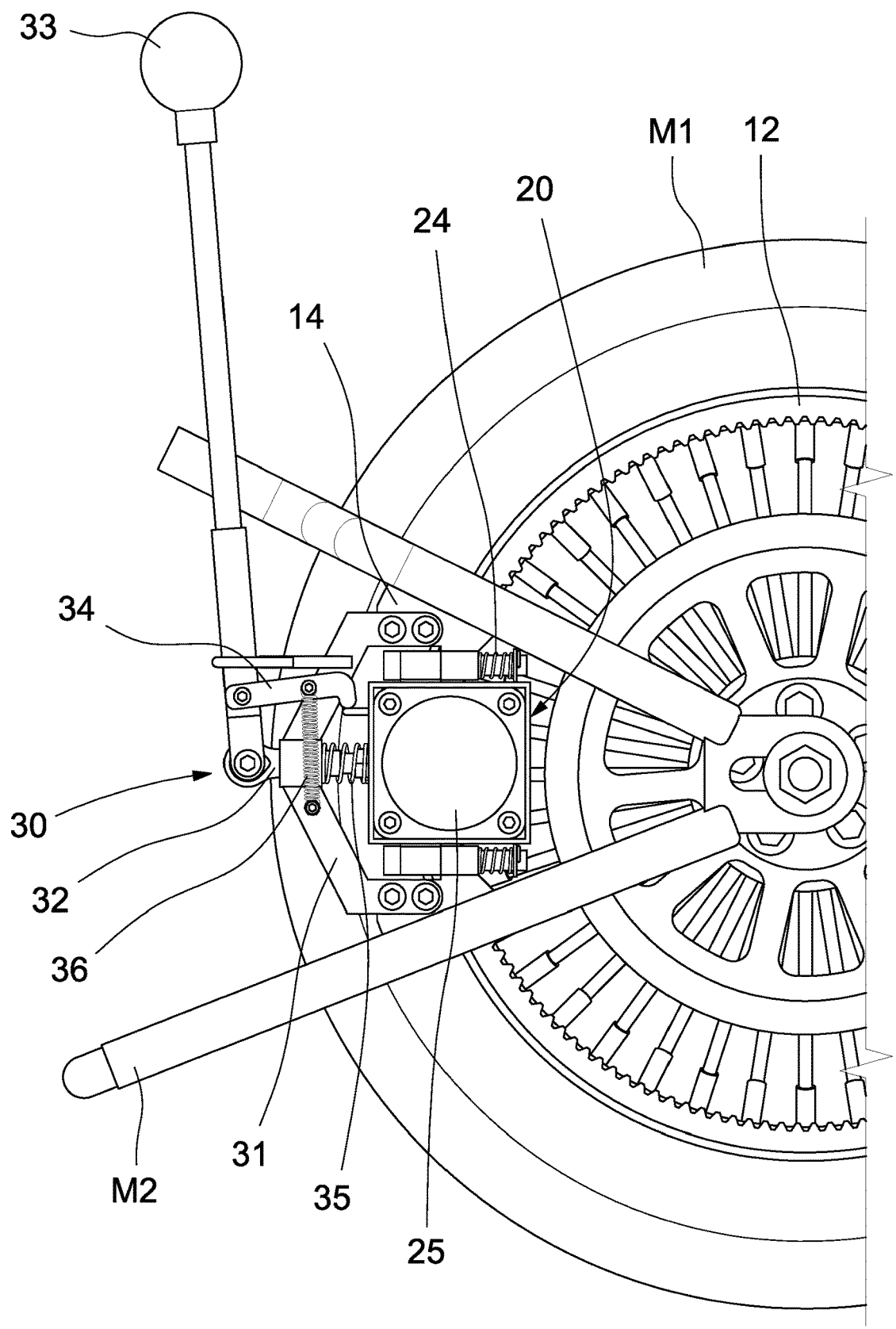
FIG. 2 is a side view of the wheel and the motorcycle-reversing device shown in FIG. 1.
Figure 4:
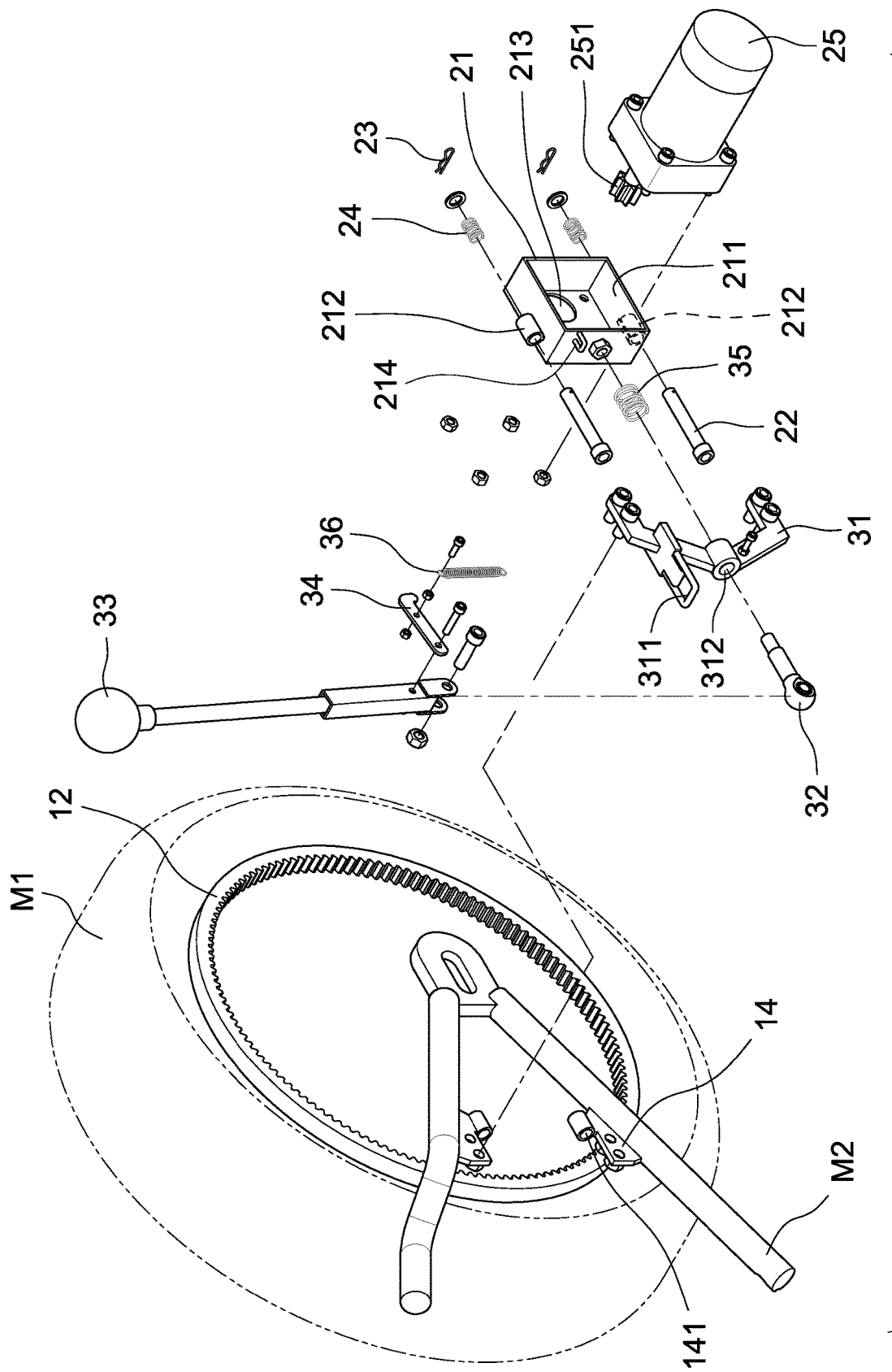
FIG. 4 is an exploded view of the motorcycle-reversing device shown in FIG. 1.
Figure 5:
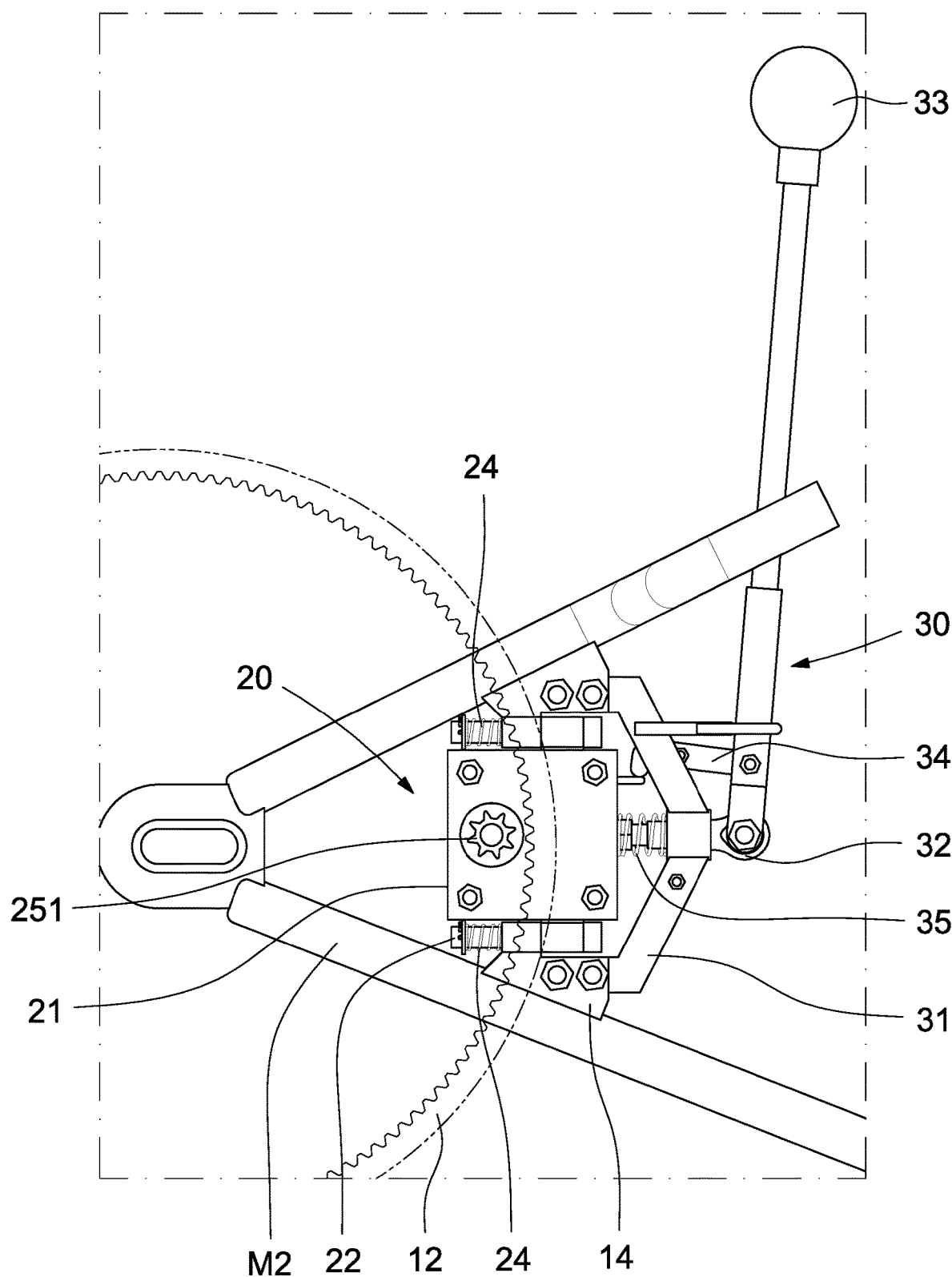
FIG. 5 is another side view of the wheel and the motorcycle-reversing device shown in FIG. 1.
Figure 6:
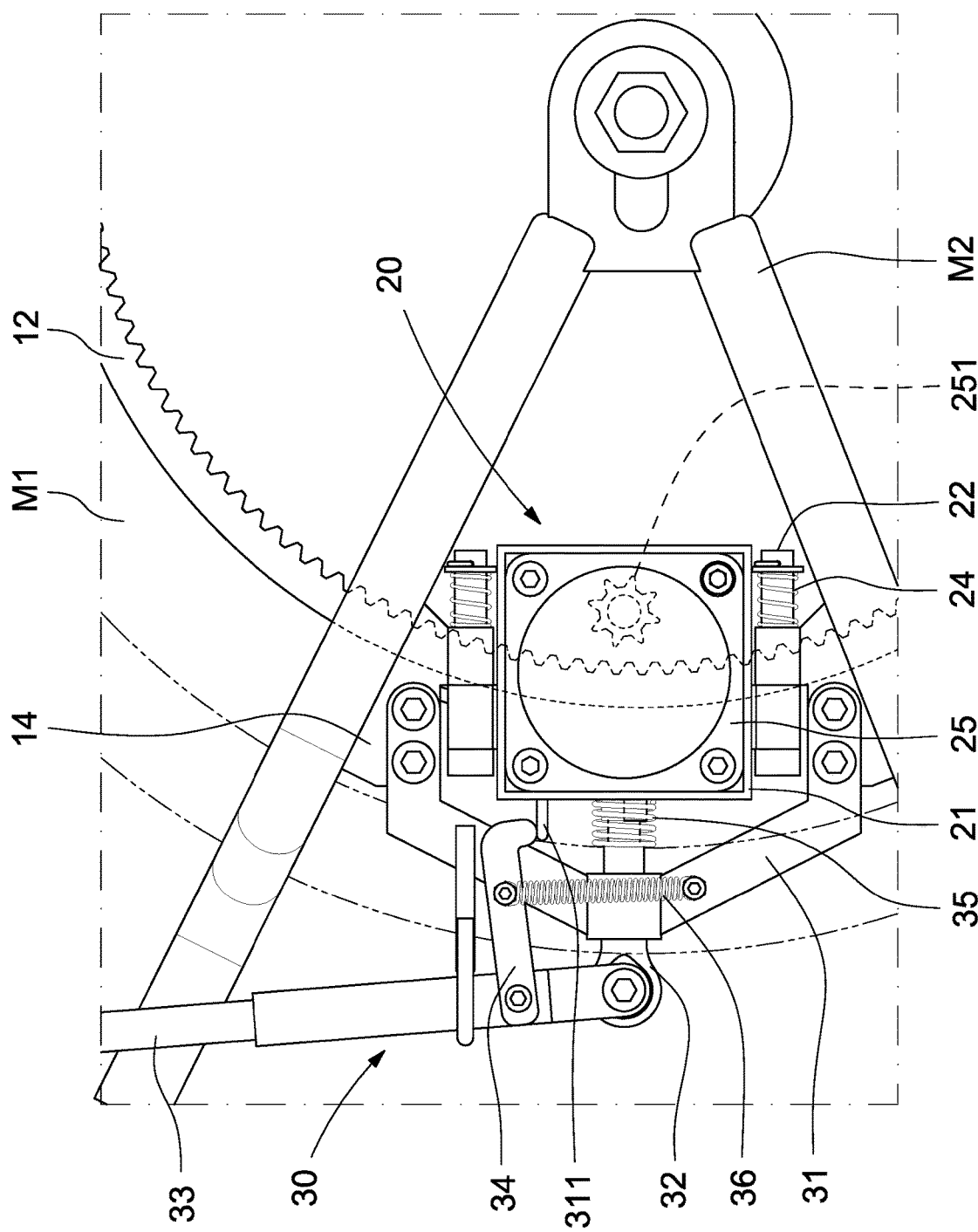
FIG. 6 is an enlarged partial view of the wheel and the motorcycle-reversing device shown in FIG. 5.
Figure 7:
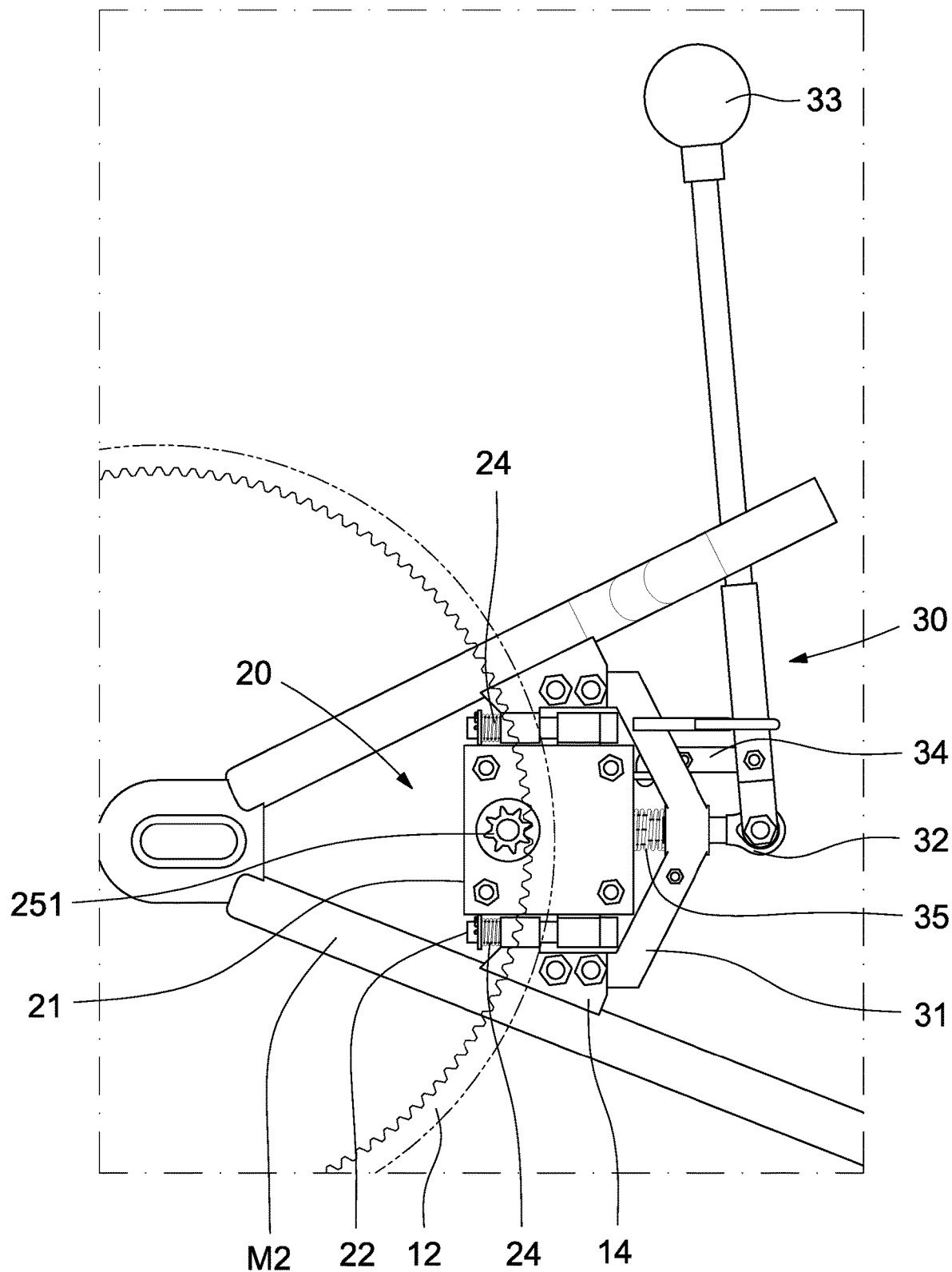
FIG. 7 is a side view of the wheel and the motorcycle-reversing device in another position than shown in FIG. 5.
Figure 8:
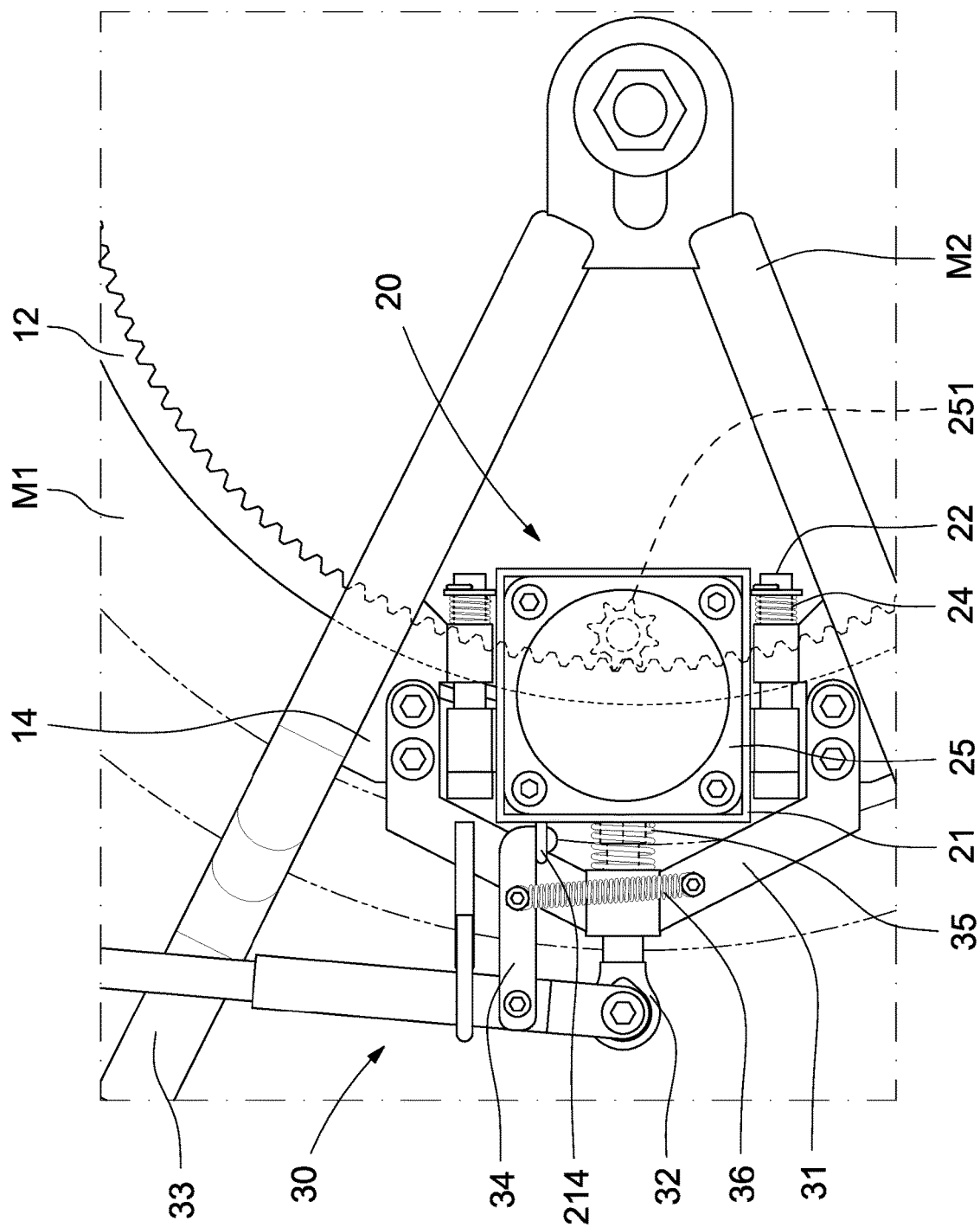
FIG. 8 is an enlarged partial view of the wheel and the motorcycle-reversing device shown in FIG. 7.

Referring to FIGS. 1, 2 and 4, the internal rack 12 extends on an internal face of the rim M3.

The ears 14 are connected to the frame M2 by welding for example. Each of the ears 14 includes a sleeve 141.

Figure 3:
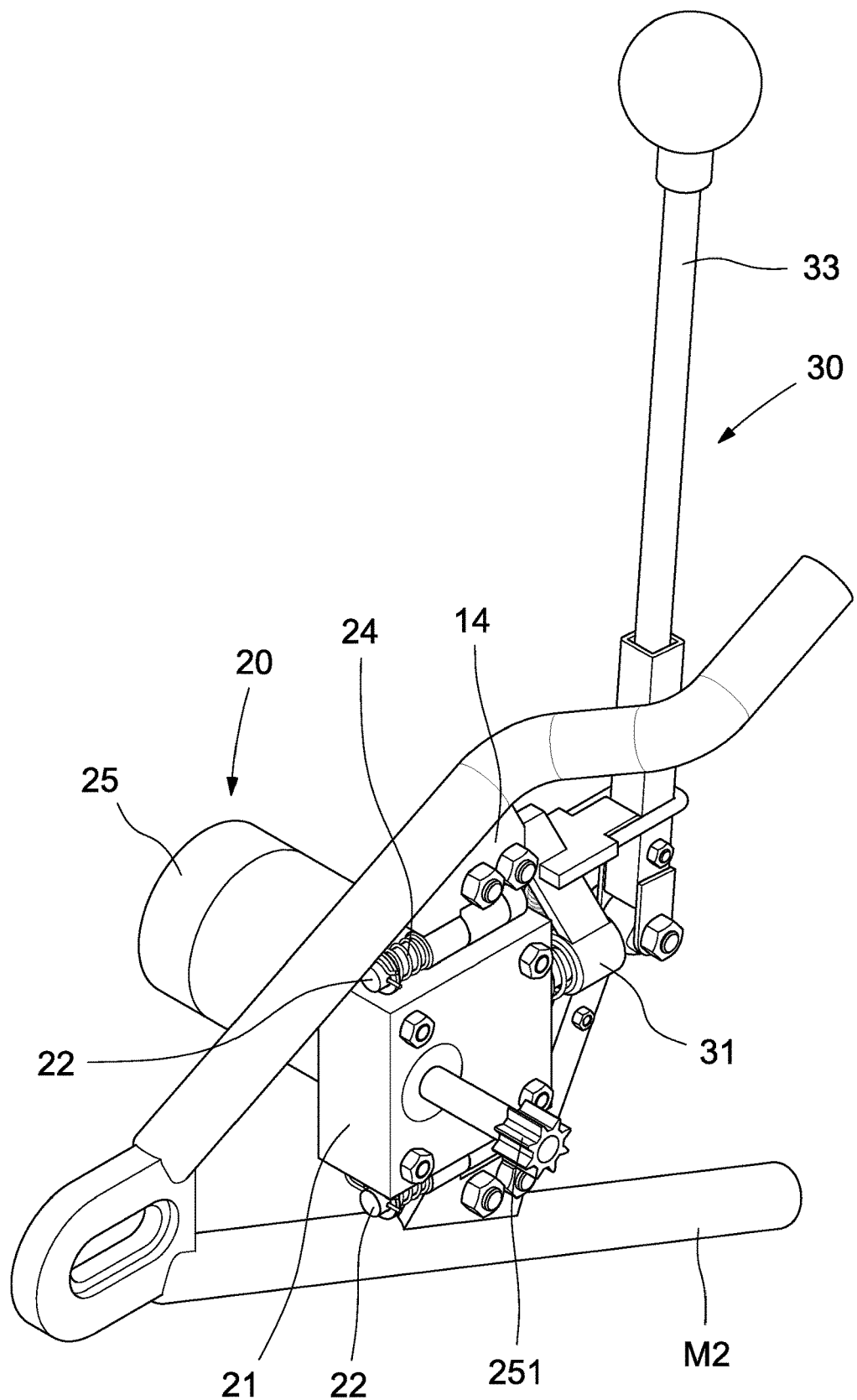
FIG. 3 is a perspective view of the motorcycle-reversing device shown in FIG. 1.

Referring to FIGS. 1 through 3, the power unit 20 includes a movable box 21, two bars 22, two restraining elements 23, two compression springs 24 and a motor 25.

The movable box 21 includes a chamber 211, two sleeves 212, an opening 213 and a lug 214.

The chamber 211 is made in an external side of the movable box 21.

One of the sleeves 212 is formed on an upper face of the movable box 21. The remaining one of the sleeves 212 is formed on a lower face of the movable box 21. The sleeves 212 are shaped and located corresponding to the sleeves 141.

The opening 213 is made in an internal side of the movable box 21. The opening 213 is in communication with the chamber 211.

The lug 214 is formed on a front wall of the movable box 21. The lug 214 is a U-shaped element with two ends connected to the front wall of the movable box 21.

Each of the bars 22 includes a head at an end and a transverse aperture in another end. Each of the bars 22 is inserted in a corresponding one of the sleeves 212 and a corresponding one of the sleeves 141. Thus, the movable box 21 is movably connected to the frame M2.

Each of the restraining elements 23 is inserted in the transverse aperture of a corresponding one of the bars 22, thereby keeping the movable box 21 on the bars 22. Each of the restraining elements 23 is a clip, a pin, a combination of a threaded bolt with a nut, or any other proper element.

Each of the compression springs 24 is compressed between a corresponding one of the restraining elements 23 and a corresponding one of the ears 14. The compression springs 24 bias the movable box 21 from the internal rack 12.

The motor 25 is located in the movable box 21. The motor 25 includes a mandrel extending from the chamber 211 via the opening 213. A pinion 251 is connected to a free end of the mandrel. The pinion 251 is engageable with the internal rack 12.

Referring to FIGS. 1 through 4, the clutch 30 is operable to engage the pinion 251 with the internal rack 12 or disengage the pinion 251 from the internal rack 12. The clutch 30 includes a bracket 31, a rod 32, a lever 33, a hook 34, a compression spring 35 and a tension spring 36.

The bracket 31 includes a sleeve 312 formed between two fins respectively connected to the ears 14. A shackle 311 is formed on an upper one of the fins.

The rod 32 is inserted in the sleeve 312 of the bracket 31 and an aperture in the front wall of the movable box 21. The rod 32 includes a head at an end and a thread on another end. The sleeve 312 is located between the head of the rod 32 and the thread. The thread is engaged with a nut connected to the front wall of the movable box 21 by welding for example.

The lever 33 is inserted in the shackle 311. A lower end of the lever 33 is pivotally connected to the head of the rod 32.

The hook 34 includes a first end pivotally connected to the lever 32 and a second end for hooking the lug 214. Thus, the lever 32 is prevented from pivoting.

The compression spring 35 is located on the rod 32. The compression spring 35 is compressed between the front wall of the movable box 21 and the sleeve 312 of the bracket 31. The compression spring 35 tends to bias the movable box 21 from the bracket 31, i.e., toward the internal rack 12. The compression spring 35 and the compression springs 24 retain the movable box 21 in position.

The tension spring 36 includes an connected to the hook 34 and another end connected to the bracket 31. The tension spring 36 tends to keep the hook 34 hooking the lug 214.

Referring to FIGS. 1 through 6, normally, the pinion 251 of the motor 25 of the power unit 20 is disengaged from the internal rack 12. The compression springs 24 and the compressions spring 35 keep the movable box 21 in position.

Referring to FIGS. 4 and 6 through 8, the lever 33 is pivoted to move an upper section of the lever 33 above the shackle 311 forward and a lower section of the lever 33 below the shackle 311 backward, i.e., toward the internal rack 12. Thus, the movable box 21 and the motor 25 are moved backward so that the compression springs 24 are further compressed. The pinion 251 of the motor 25 is eventually engaged with the internal rack 12. The hook 34 is engaged with the lug 214 of the movable box 21 to keep the pinion 251 engaged with the internal rack 12.

Then, the motor 25 is turned on to rotate the pinion 251. The pinion 251 rotate the internal rack 12, which is connected to the rim M3 of the rear wheel. Thus, the motorcycle or scooter is easily reversed with the motor 25, not manually.

When the motorcycle or scooter is reversed to a desired extent, the motor 25 is turned off. The hook 34 is disengage from the lug 214 of the movable box 21. The lever 33 is pivoted in an opposite direction to move the movable box 21 and the motor 25 forward, thereby disengaging the pinion 251 from the internal rack 12.

The present invention has been described via the illustration of the preferred embodiment. Those skilled in the art can derive variations from the preferred embodiment without departing from the scope of the present invention. Therefore, the preferred embodiment shall not limit the scope of the present invention defined in the claims.

The invention claimed is:

1. A motorcycle-reversing device comprising:
   an internal rack (12) connected to a rim (M3) of a motorcycle;
   two ears (14) connected to a frame (M2) of the motorcycle;
   a power unit (20) comprising:
   two bars (22) connected to the ears (14);
   a movable box (21) comprising two minor sleeves (212) for receiving the bars (22);
   a motor (25) located in the movable box (21); and
   a pinion (251) operatively connected to the motor (25); and
   a clutch (30) pivotable to move the movable box (21) between a first position where the pinion (251) is engaged with the internal rack (12) and a second position where the pinion (251) is disengaged from the internal rack (12).

2. The motorcycle-reversing device according to claim 1, comprising two restraining elements (23) connected to the bars (22) and two minor compression springs (24) each of which is located on a corresponding one of the bars (22) and compressed between the movable box (21) and a corresponding one of the restraining elements (23).

3. The motorcycle-reversing device according to claim 1, wherein the clutch (30) further comprises:
   a lever (33);
   a bracket (31) comprising two ends connected to the ears (14), a shackle (311) for receiving the lever (33), and a sleeve (312); and
   a rod (32) inserted in the sleeve (312) of the bracket (31) and an end pivotally connected to the lever (33) and another end connected to the movable box (21).

4. The motorcycle-reversing device according to claim 3, wherein the clutch (30) further comprises a major compression spring (35) located on the rod (32) and compressed between the bracket (31) and the movable box (21).

5. The motorcycle-reversing device according to claim 1, wherein the movable box (21) comprises a lug (214), wherein the clutch (30) further comprises a lever (33) and a hook (34) formed with an end pivotally connected to the lever (33) and another end engageable with the lug (214).

6. The motorcycle-reversing device according to claim 5, wherein the clutch (30) further comprises a tension spring (36) formed with an end connected to the hook (34) and another end connected to the bracket (31).

* * * * *